United States Patent Office 3,644,386
Patented Feb. 22, 1972

3,644,386
2-AMINOALKYL PYRROL-3-YL KETONES
Irwin J. Pachter, 42 Juneau Blvd., Woodbury, N.Y. 11797, and Karl Schoen, 83–36 Beverly Road, Kew Gardens, N.Y. 11415
No Drawing. Application Sept. 1, 1967, Ser. No. 664,942, which is a continuation-in-part of application Ser. No. 575,303, Aug. 26, 1966, which in turn is a continuation-in-part of application Ser. No. 599,387, Dec. 6, 1966. Divided and this application July 15, 1968, Ser. No. 768,565
Int. Cl. C07d 27/26
U.S. Cl. 260—296      4 Claims

ABSTRACT OF THE DISCLOSURE

Process for preparing 2-aminoalkyl pyrrol-3-yl ketones and derivatives thereof, and oxopyrroles thus produced. The process is carried out by quaternizing 2-dimethyl-amino- or 2-piperidinyl-alkyl-pyrrol-3-yl ketones or derivatives thereof, particularly derivatives having bi- and tricyclic nuclei, and reacting the quaternary salts either with a base and an amine, or, alternatively, with an amine only.

CROSS REFERENCE TO OTHER APPLICATIONS

This application is a division of application Ser. No. 664,942, filed Sept. 1, 1967 and now abandoned, which application was in turn a continuation in part of our copending applications Ser. No. 575,303, filed Aug. 26, 1966, now abandoned and Ser. No. 599,387, filed Dec. 6, 1966 and now abandoned. Certain of the compounds disclosed herein are described in our copending applications Ser. No. 403,387, filed Aug. 12, 1964 and now Pat. No. 3,410,857 issued Nov. 12, 1968, and Ser. No. 357,284, filed Apr. 3, 1964 and now abandoned.

BACKGROUND OF THE INVENTION

(1) Field of the invention

This invention relates to novel compounds which are useful as tranquilizers, anti-depressants and analgetics.

(2) Description of the prior art

Various compounds within the following class are known and have been described, for example, in our above-noted copending applications.

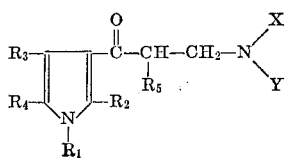

In the above formula:
$R_1$ designates hydrogen, a lower alkyl group having a maximum of 6 carbon atoms, phenyl, phenyl alkyl (where the alkyl group has up to 3 carbons), substituted phenyl or substituted phenyl lower alkyl in which the substituent on the phenyl ring is halogen, lower alkyl, i.e., wherein the alkyl group has not more than 4 carbon atoms, lower alkoxy of not more than 4 carbon atoms, halogenated alkyl of not more than 4 carbon atoms, or 2-, 3- or 4-pyridyl;
$R_2$, $R_3$ and $R_4$ designate hydrogen alkyl, alkenyl or cycloalkyl having a maximum of 8 carbon atoms, phenyl, halo-phenyl, (lower alkoxy) phenyl, thionyl, furyl, or benzyl;
$R_3$ and $R_4$ may be linked to constitute an alicyclic ring having a maximum of 8 carbon atoms;

$R_5$ designates hydrogen, alkyl, alkenyl or cycloalkyl, all having a maximum of 8 carbon atoms, phenyl or benzyl; and
$R_2$ or $R_3$ may be linked with $R_5$ to constitute alicyclic rings having a maximum of 8 carbon atoms, those rings formed by linking $R_2$ and $R_5$ optionally being substituted by alkyl groups having 1–4 carbon atoms and those rings formed by linking $R_3$ and $R_5$ optionally being substituted by an alkyl or alkylidene group having 1–4 carbons atoms, a benzylidene or a benzyl group.
X and Y are each the same or different and are hydrogen, lower alkyl, lower alkynyl, lower alkenyl, cycloalkyl, bicycloalkyl, hydroxy-lower alkyl, alkoxy-lower alkyl, lower dialkylamino, lower acyloxyalkyl, carbamoyloxy-lower alkyl, phenyl-lower alkyl, heteroaromatic lower alkyl, heteroaryl and saturated heteroaryl, and wherein X and Y may be linked, and when linked constitute a heterocyclic ring of not more than eight members.

Some of the compounds embraced within the scope of general Formula A, as set forth above, have heretofore been prepared, or may be prepared, through the Mannich reaction of the corresponding pyrrol-3-yl ketone with formaldehyde or a formaldehyde-yielding substance, e.g., paraformaldehyde, and a base X—NH—Y as set forth in the following reaction scheme:

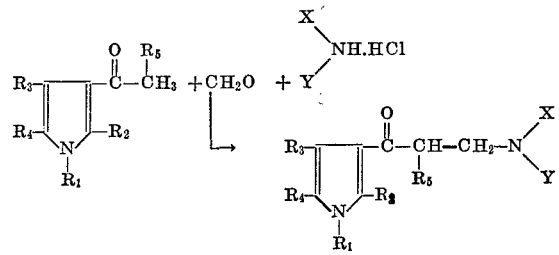

Resonance interaction of the electron-rich pyrrole ring with the ketone carbonyl in the pyrrole ketones renders these less reactive than structurally related aromatic ketones such as phenyl ketones and naphthyl ketones. One result of such lower reactivity is that the Mannich reaction proceeds very slowly with many of the important bases X—NH—Y or their corresponding salts. It has been found that side reactions occur during the prolonged reflux periods necessary for complete reaction; and frequently there are produced dark products which are difficulty to purify.

Of the various Mannich reactions carried out, those with dimethylamine hydrochloride proceed most rapidly, with better yield and with higher purity. However, it has not been possible to produce primary or secondary amino alkyl ketones by the method of Reaction Scheme I, that is to say, compounds of general Formula A herein wherein the moieties X and Y may either or both be hydrogen.

Compounds where X and/or Y are lower alkynyl, lower alkenyl, cycloalkyl alkoxy-lower alkyl, lower dialkylamino, heteroaromatic lower alkyl, heteroalkyl and saturated heteroaryl have not been disclosed heretofore.

SUMMARY OF THE INVENTION

We have discovered that it is advantageous in the preparation of pure products of Formula A in high yield to use as starting materials compounds of the following formula:

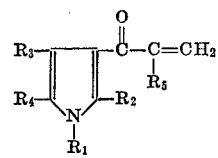

FORMULA B

Compounds of Formula B can be conveniently produced from quaternized salts of the dimethylamine Mannich bases of Formula A by splitting off therefrom, under alkaline conditions, the tertiary amine moiety.

Thus, it can be generalized that the dimethylamine Mannich bases can stitute the starting materials for the preparation of Mannich bases having a different amino function from that of starting compound A.

Illustrative of our process is the sequence of stops just mentioned and set forth below:

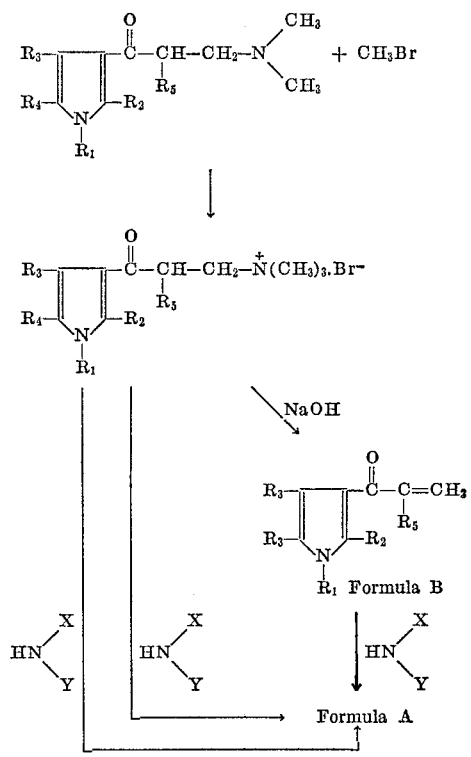

REACTION SCHEME II

In accordance with such process, which is the subject of our copending application Ser. No. 768,569 filed July 16, 1968, the dimethylamine Mannich base is quaternized with an alkyl halide or sulfate, suitably a lower alkyl halide or sulfate such as methyl-, ethyl- or propyl-bromide, chloride, iodide, or sulfate, and the resulting quaternary salt is treated with aqueous alkali, suitably aqueous sodium or potassium hydroxide, to produce the stable methylene derivative.

Upon interaction of the methylene compound with a new base there is produced a final product of good quality and in high yield.

The success of such process is a comsequence of the unusual stability of the methylene compounds of the Formula B (in which the symbols $R_1$ to $R_5$ have the same meaning as in Formula A). The compounds of Formula B are more resistant to polymer-forming side reactions than are structurally comparable aryl derivatives such as the acrylophenones.

The novel compounds of the present invention are those of Formula A wherein the moiety X and/or Y are hydrogen, which could not be satisfactorily prepared by the method of Reaction Scheme I. The present invention further includes compounds wherein X and/or Y are lower alkynyl, lower alkenyl, cycloalkyl, alkoxy-lower alkyl, lower dialkylamino, heteroaromatic lower alkyl, heteroaryl and saturated heteroaryl, which have not been disclosed heretofore.

More particularly, the novel compounds within the scope of the present invention are those of the formula:

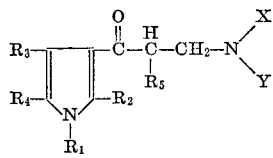

wherein $R_1$, $R_2$, $R_3$, $R_4$ and $R_5$ are hydrogen or lower alkyl, X is hydrogen, lower alkyl, hydroxy-lower alkyl, lower acyloxyalaky, carbamoyloxy-lower alkyl, phenyl lower alkyl, cycloalkyl, lower alkenyl, lower alkynyl, di-(lower alkyl) amino, a heterocyclic radical or a heterocyclo lower alkyl radical; and Y is lower alkenyl, lower alkynyl, di-(lower alkyl) amino, hydrogen, a heterocyclic radical or a heterocyclo lower alkyl radical.

The compounds of the foregoing formulla have central nervous system activity; and are particularly useful as tranquilizers, ataractics, and sedatives. They are also useful as analgetics and antidepressants.

The compounds can be put up in customary pharmaceutical composition forms such as tablets, capsules, syrups, suppositories etc., in accordance with the techniques of pharmaceutical compounding employing appropriate carrier or vehicular materials as excipients, etc.

The compounds may be administered at dosage levels of about 0.07–3 mg./kg., preferably between 0.7–1.8 mg./kg., daily. A compound prepared by the process described herein showed marked antipsychotic activity in humans when administered at the preferred level—i.e., 50–125 mg. per patent daily. Chronic schiophenic male patients showed improvement in disorientation, thinking and percetual distortion as well as in schizophrenic disorganization and social competence.

THE PREFERRED EMBODIMENTS OF THE INVENTION

In the preferred embodiments of the present invention, $R_1$ and $R_5$ are hydrogen or a lower alkyl group such as methyl, ethyl, propyl, butyl or hexyl; and $R_2$, $R_3$ and $R_4$ are alkyl groups, suitably lower alkyl radicals such as methyl, propyl, butyl or hexyl.

X may be hydrogen; lower alkyl such as methyl, ethyl, butyl, phentyl, hexyl or heptyl; hydroxy-lower alkyl; lower acyloxy-alkyl, suitably lower alkanoyloxy-lower alkyl; carbamoyloxy-lower alkyl; phenyl lower alkyl; cycloalkyl suitably cyclo-lower alkyl such as cyclopropyl, cyclobutyl, cyclopentyl, cyclohexyl or cyclooctyl; lower alkenyl, such as propenyl, butenyl or hexenyl; lower alkynyl, such as propynyl, butynyl or pentynyl; di-(lower alkyl) amino, such as dimethylamino; or heterocyclic or heterocyclo lower alkyl radicals.

Y may be lower alkenyl, such as propenyl, butenyl or hexenyl; lower alkynyl, such as propynyl, butynyl or pentynyl; di-(lower alkyl) amino, such as dimethylamine; hydrogen, or heterocyclic or heterocycle lower alkyl radicals.

When either X or Y is a heterocyclic radical or a heterocycle lower alkyl radical, it may be a saturated or unsaturated hetero group, including piperidine, piperidinyl, pyrrolidinyl, morpholino, morpholinyl, thiomorpholine, thiomorpholinyl, piperazinyl, pyridyl, pyrimidinyl, pyridazinyl, pyrazolyl, quinolyl, isoquinolyl, pyrrolyl, thienyl, furyl, oxazolyl or tetrazolyl groups. In the above formula, it will be understood that, unless otherwise indicated, the lower alkyl or like radicals include both straight and branched chain groups of no more than five carbon atoms.

In a preferred modification of the process for synthesizing the oxopyrroles hereof, a dimethylamino Mannich base within general Formula A is utilized as the starting material for other Mannich bases of Formula A having a different amino function.

Although dimethylamine Mannich bases are most advantageous as starting materials for this process, other lower alkylamino Mannich bases as well as heterocyclic bases such as the piperidino Mannich base may also be used.

In the preferred procedure, the Mannich base, which is usually obtained in the form of an acid salt, suitably the hydrochloride, is treated with aqueous ammonia and the free Mannich base isolated from the aqueous mixture. In a suitable mode of isolation, the base is extracted from the reaction mixture with a low boiling, reaction inert, water-immiscible solvent, such as ethyl acetate, diethyl ether, or the like. Upon evaporation of the solvent, the base is taken up in a suitable organic solvent, preferably a non-hydroxylic, polar organic solvent such as acetone, and treated with the quaternizing agent. In the preferred modification, gaseous methyl bromide is used as the quaternizing agent, and is bubbled into the solution of the Mannich base until no further separation of the quaternary is noted. The quaternary salt is then isolated as a residue by filtration, and recrystallized, suitably from a lower alkanol such as methanol.

The quaternary salt has the general Formula C

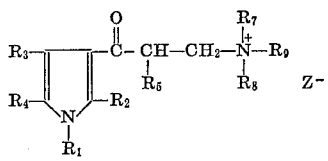

Where $R_1$, $R_2$, $R_3$, $R_4$ and $R_5$ are as above.

$R_9$, $R_7$ and $R_8$ are alkyl having from 1 to 8 carbon atoms; however, $R_9$ and $R_7$ may be joined to form a ring containing up to 7 carbon atoms, i.e., the piperidine, pyrrolidine and hexamethyleneimino nuclei;

Z is an inorganic radical such as chloride, bromide, sulfate, or the like.

The quaternary salt of the Mannich base, for example, the methobromide, the methiodide, the methosulfate, or the like, is dissolved in water and treated with an excess of an alkali such as aqueous sodium hydroxide, ammonia, or a strong organic base such as triethylamine. The desired vinyl compound of general Formula B separates as a precipitate, and is isolated. The vinyl compound of general Formula B is then purified, preferably by recrystallization from the suitable solvents such as a lower alkanol, preferably ethanol.

The vinyl compounds of general Formula B are then reacted with amines of the general Formula X—NH—Y, wherein X and Y have the significance set forth hereinabove, and may thus represent primary amines or secondary acyclic amines.

The reaction of the amine with the compound of Formula B may be carried out in a number of modifications. The preferred mode will depend upon the reactivity and volatility of the respective reactants. Many primary and secondary amines will react with compounds of Formula B at ambient temperature, that is to say, from about 10° C. to about 30° C. with evolution of heat where the reaction is carried out in a solvent such as a lower alkanol, for example, methanol, ethanol, propanol, butanol, and the like, or in di-lower alkyl ketones, for example, acetone, methylethyl ketone, di-isopropyl ketone, and the like, as well as in lower alkyl lower alkanoates such as ethyl acetate, propyl acetate and butyl propionate.

Where desired, the reaction may be carried out in similar solvents under reflux at temperatures of from about 50° about 150° C. Where it is desired to use low boiling solvents, particularly with volatile amines, the reaction may be advantageously carried out in pressure vessels at temperatures up to about 150° C. In yet another modification of the procedure, it is sometimes advantageous to use excess of the amine base itself as the solvent.

Reaction time varies from one minutes to 24 hours, depending upon the nature of the reactants. Most reactions proceed to completion in less than 8 hours.

Among the amines which may be employed in the process of the present invention which may be primary or secondary, may be included those bearing alkyl groups, suitably lower-alkyl groups, such as methyl, ethyl, propyl, and butyl; cycloalkyl groups, such as cyclopropyl and cyclohexyl; alkenyl groups, suitably lower-alkenyl groups, such as allyl, methallyl and hexenyl; alknyl groups, suitably lower alkynyl groups, such as propynyl, butynyl, and hexynyl groups; or phenyl alkyl groups, suitably phenyl loweralkyl groups such as benzyl, phenethyl, and phenylbutyl groups; alkoxy-alkyl groups, suitably lower alkoxy-lower alkyl groups, such as methoxyethyl, ethoxyethyl, butoxyethyl, pentoxypropyl; hydroxyalkyl groups, suitably hydroxy-lower alkyl groups, such as hydroxyethyl, hydroxypropyl, hydroxybutyl, or hydroxyhexyl; dialkylamino, such as dimethylamino.

Also included within the scope of the amines used in this process are heterocyclic secondary amines, wherein this process are primary and secondary if desired, itself be substituted.

Furthermore, there are included primary and secondary amines wherein one of the substituents of the amino moiety corresponds to a radical derived from any of the aforementioned heterocyclic groups, for example, morpholinyl, pyrrolidinyl, thiomorpholinyl, piperazinyl, as well as the unsaturated derivatives thereof, for example, picolyl, tetrazolyl, and the like.

In another modification of the process, the quaternary salt (Formula C) derived from the starting material Mannich base of Formula A may be converted into the desired end product without the isolation of the intermediate methylene compound of Formula B.

In this modification as set forth in Reaction Scheme II, the new organic base, that is to say, the amine, may serve as both the source of alkali and the reactant.

EXAMPLE 1

Preparation of miscellaneous pyrrole ketones

Ten g. of 4-butyl-2,5-dimethylpyrrol-3-yl vinyl ketone, 15 ml. of the amine reactant and 15 ml. of ethanol were heated spontaneously to 50° upon mixing and formed a clear solution. The reaction was brought to completion by brief heating on a steam bath. Evaporation to dryness left a residue which solidified. Recrystallization from cyclohexane gave the product.

By so treating 4 - butyl-2,5-dimethylpyrrol-3-yl vinyl ketone with 4-picolylamine, 3-picolyamine and 2-propynylamine, the following are obtained:

(1.1) 4 - butyl-2,5-dimethylpyrrol-3-yl 2-(4-picolylaminoethyl) ketone, M.P. 127–128°;

(1.2) 4 - butyl-2,5-dimethylpyrrol-3-yl 2-(3-picolylaminoethyl) ketone dihydrochloride, M.P. 189–191°;

(1.3) 4 - butyl - 2,5-dimethylpyrrol-3-yl 2-(2-propynylamino)ethyl ketone hydrobromide, M.P. 169°.

In analogous procedures, 4-ethyl-2,5-dimethylpyrrol-3-yl vinyl ketone is reacted with benzylamine, ethylamine, methylamine and ammonia to yield the following products:

(1,4) Benzylaminoethyl 4 - ethyl-2-, 5-dimethylpyirrol-3-yl ketone, M.P. 112°.

(1.5) Ethylaminoethyl 4 - ethyl - 2,5-dimethylpyrrol-3-yl ketone, M.P. 80–84°.

(1.6) 4 - ethyl-2,5-dimethylpyrrol-3-yl methylaminoethyl ketone, M.P. 83–84° C.

(1.7) Aminoethyl 4 - ethyl-2,5-dimethylpyrrol-3-yl ketone.

The active compounds of this invention may be taken in tablets or capsules in doses of 1–00 mg., in syrup at 0.5–20 mg./ml. concentration, in 1–50 mg. suppositories or by parenteral injection in 0.5–50 mg./ml. concentration. More particularly, the oxo pyrroles hereof may be formulated in the same manner as the oxoisoindoles identified in the following further examples:

EXAMPLE 2

| Ingredients: | Mg./tablet |
|---|---|
| 4,5,6,7 - tetrahydro - 1,3-dimethyl-5-dimethylaminoethyl-4-oxoisoindole hydrochloride | 10 |
| Lactose USP (spray dried) | 170 |
| Starch USP | 10 |
| Magnesium stearate USP | 1 |
| Flavor, q.s. | |

All above ingedients were passed through a 60-mesh sieve, blended for 30 minutes and compressed directly into tablets on a suitable tablet press at a weight of 191 mg., using a 11/32" biconcave scored punch.

EXAMPLE 3

| Ingredients: | Mg./suppository |
|---|---|
| 4,5,6,7 - tetrahydro-1,3-dimethyl-5-morpholinomethyl-4-oxoisoindole hydrochloride | 100 |
| Cocoa butter, q.s. | |

The drug and cocoa butter are combined, mixed thoroughly and formed into 2 gram suppositories.

EXAMPLE 4

| Ingredients: | Mg./capsule |
|---|---|
| 4,5,6,7 - tetrahydro - 1,3 - dimethyl-4-oxo-5-piperidinomethylisoindole hydrochloride | 20 |
| Lactose USP | 100 |
| Magnesium stearate | 1 |
| Amorphous silicon dioxide (Cab-O-Sil) | 5 |

These ingredients were combined, blended and passed through a No. 1 screen of Fitzpatrick comminutor machine before encapsulating into a two-piece hard gelatin No. 3 capsule on a standard capsulating machine at a net weight of 126 mg.

EXAMPLE 5

| Ingredients: | Mg./ml. |
|---|---|
| 4,5,6,7 - tetrahydro - 1,2,3 - trimethyl - 5 - dimethylaminomethyl - 4 - oxoisoindole hydrochloride | 5 |
| Sodium chloride, q.s. for isotonicity. | |
| Methylparaben USP | 1.8 |
| Propylparaben USP | 0.2 |
| Water, q.s. | |

The above ingredients are combined in sterile solution for parenteral use.

EXAMPLE 6

| Ingredients: | Grams/liter |
|---|---|
| 4,5,6,7 - tetrahydro - 1-methyl-5-dimethylaminomethyl-4-oxo-3-phenylisoindole hydrochloride | 10 |
| Granulated sugar | 600 |
| Flavor, q.s. | |
| Color, q.s. | |
| Sodium benzoate | 1 |
| Deionized water, q.s. | |

All above ingredients are dissolved in water, combined and made up to a volume of one liter.

The 4-butyl-2,5-dimethylpyrrol-3-yl vinyl ketone is prepared as follows: 2-oximino-3-heptanone and 2,4-pentanedione were condensed in a Knorr synthesis to produce 4-butyl-2,5-dimethylpyrrol-3-yl methyl ketone, M.P. 124–125°. The ketone (0.1 mole), dimethylamine hydrochloride (0.15 mole) and paraformaldehyde (0.15 mole) were heated under reflux in 250 ml. of ethanol for 24 hours. Another 1.5 g. of paraformaldehyde was added and reflux was continued for a total of 48 hours. Evaporation yielded 4-butyl-2,5-dimethylpyrrol-3-yl 2-dimethylaminoethyl ketone hydrochloride, M.P. 157–160°. Aqueous ammonia liberated the base which was dissolved in acetone and treated with methyl bromide to produce 4-butyl-2,5-dimethylpyrrol-3-yl dimethylaminoethyl ketone methobromide, M.P. 166–168.5°. The methobromide was dissolved in water and treated with aqueous sodium hydroxide to precipitate the vinyl ketone, M.P. 106° after recrystallization from isopropanol.

In accordance with the above procedure, but starting with 2-oximino 3-pentanone, there is obtained 4-ethyl-2,5-dimethylpyrrole-3-yl vinyl ketone M.P. 148–149°.

We claim:

1. A compound having the formula $$R_3 \underset{R_4 \quad R_1 \quad R_2}{\overset{\displaystyle N}{\diagdown \diagup}} \overset{\displaystyle O}{\overset{\|}{C}} - \underset{R_5}{\overset{H}{C}} - CH_2 - N\overset{X}{\underset{Y}{\diagdown}}$$

wherein $R_1$, $R_2$, $R_3$, $R_4$ and $R_5$ are hydrogen or lower alkyl;

X is hydrogen, lower alkyl, hydroxy-lower alkyl, phenyl-lower alkyl, cyclo-lower alkyl, lower alkenyl, lower alkynyl, di(lower alkyl) amino, or a heterocyclo-lower alkyl radical;

Y is hydrogen, lower alkenyl, lower alkynyl, di(lower alkyl) amino, or a heterocyclo lower alkyl radical; and when either X or Y is a heterocyclo-lower alkyl radical, the heterocycle is a piperidino, piperidinyl, pyrrolidinyl, morpholino, morpholinyl, thiomorpholino, pyridyl, or furyl group, the lower alkyl moieties of which groups contain no more than 5 carbon atoms;

and the pharmaceutically acceptable acid addition salts thereof.

2. A compound according to claim 1, having the designation 4-butyl-2,5-dimethylpyrrol-3-yl 2-(4-picolylamino)-ethyl ketone; and the pharmaceutically acceptable acid addition salts thereof.

3. A compound according to claim 1, having the designation ethylaminoethyl 4-ethyl-2,5-dimethylpyrrol-3-yl ketone; and the acid salts thereof.

4. A compound according to claim 1, having the designation 4-butyl-2,5-dimethylpyrrol-3-yl 2-(2-propynylamino)ethyl ketone; and the pharmaceutically acceptable acid addition salts thereof.

References Cited

UNITED STATES PATENTS 3,491,093   1/1970   Pachter et al.

ALEX MAZEL, Primary Examiner

J. A. NARCAVAGE, Assistant Examiner

U.S. Cl. X.R.

260—243 B, 247.2 B, 247.5 R, 250 A, 256.4 R, 268 MK, 287 R, 288 R, 294.3 A, 294.7 G, 295 R, 307 R, 308 D, 310 R, 326.3, 326.5 R, 326.5 G, J, D, SM; 424—246, 248, 250, 251, 258, 263, 267, 269, 272, 274

UNITED STATES PATENT OFFICE
CERTIFICATE OF CORRECTION

Patent No. 3,644,386             Dated February 22, 1972

Inventor(s)  Irwin J. Pachter and Karl Schoen

It is certified that error appears in the above-identified patent and that said Letters Patent are hereby corrected as shown below:

Column 1, line 34, for "Aug." read -- Oct. --; line 55, read FORMULA A --; line 58, for "phenyl alkyl" read -- phenyl-alkyl --; line 60, for "phenyl lower alkyl" read -- phenyl-lower alkyl --; line 66, for "hydrogen alkyl," read -- hydrogen, alkyl, --; line 68, for "halo-phenyl," read -- halophenyl, -- and for "thionyl" read -- thienyl --. Column 2, below line 25, read -- REACTION SCHEME I -- ; line 28, the side chain of the pyrrole reactant should read --

$$-\overset{\overset{O}{\|}}{C}-CH_2\overset{R_5}{|}$$

--; lines 46-47, for "difficulty" read -- difficult --; last line, read -- FORMULA B --. Column 3, line 1, delete "FORMULA B"; line 7, for "stitute" read -- constitute --; line 10, for "stops" read -- steps --; line 35, lower left-hand corner of Formula B, for "$R_3$" read -- $R_4$ --; line 40, before the middle formula $$HN\diagdown_Y^X\text{"},$$

read -- 2 --; line 60, for "comsequence" read -- consequence --. Column 4, line 13, for "phenyl" read -- phenyl- --; line 34, for "patent" read -- patient -- and for "schiophenic" read -- schizophrenic --; line 36, for "percetual" read -- perceptual --; line 46, for "phentyl" read -- pentyl --; line 48, for "phenyl lower alkyl;" read -- phenyl-lower alkyl --; line 57 for "dimethylamine" read -- dimethylamino --; line 58, for "heterocycle" read -- heterocyclo --; line 61, for "heterocycle" read -- heterocyclo --; line 62, for "piperidine" read -- piperidino --; line 64, for "pholine: read -- pholino --. Column 5, line 1, for "dimethylamine" read -- dimethylamino --; line 27, for "$R_8$ Z-" read -- $R_8 \cdot Z^-$ --; line 33, for "Where" read -- where --; line 36, for "piperidine," read -- piperidino, --; line 37, for "rolidine" read -- rolidino --; line 41, for

UNITED STATES PATENT OFFICE
CERTIFICATE OF CORRECTION

Patent No. 3,644,386  Dated February 22, 1972

Inventor(s) Irwin J. Pachter and Karl Schoen   Page - 2

It is certified that error appears in the above-identified patent and that said Letters Patent are hereby corrected as shown below:

"methobromine" read -- methobromide --; line 43, for "soduim" read -- sodium --; line 70, before "about" read -- to --. Column 6, line 10, for "alknyl" read -- alkynyl --; line 12, for "phenyl alkyl" read -- phenyl-alkyl --; lines 21-24, delete "heterocyclic secondary...there are included"; lines 43-44, for "ethanol were heated" read -- ethanol heated --; line 63, for "(1.4) Benzylaminoethyl 4 - ethyl-2, 5-dimethyl-pyirrol-3-" read -- (1.4) Benzylaminoethyl 4-ethyl-2,5-dimethyl-pyrrol-3- --; line 72, for "1-00" read -- 1-100 --. Column 7, lines 11, 21, 47, 56, 57 and 59, each instance, read "q.s." in the right-hand column; line 20, for "100" read -- 100 mg. --; line 44, read "q.s. for isotonicity" in the right-hand column; line 45, for "1.8" read -- 1.8 mg. --; line 46, for "0.2" read -- 0.2 mg. --. Column 8, line 48, for "acid" read -- pharmaceutically acceptable acid addition --.

Signed and sealed this 16th day of April 1974.

(SEAL)
Attest:

EDWARD M.FLETCHER,JR.
Attesting Officer

C. MARSHALL DANN
Commissioner of Patents